United States Patent [19]

VanDuyn et al.

[11] Patent Number: 4,722,033
[45] Date of Patent: Jan. 26, 1988

[54] VEHICLE HEADLAMP ASSEMBLY

[75] Inventors: Paul D. VanDuyn; Carey D. Marks, both of Anderson; Michael E. O'Shaughnessey, Fort Wayne, all of Ind.

[73] Assignee: General Motors Corporation, Detroit, Mich.

[21] Appl. No.: 39,924

[22] Filed: Apr. 20, 1987

[51] Int. Cl.$^4$ ............................................. B60Q 1/06
[52] U.S. Cl. ..................................... 362/80; 362/289; 362/419; 362/427
[58] Field of Search ............... 362/80, 238, 239, 289, 362/419, 421, 423, 424, 427

[56] References Cited

U.S. PATENT DOCUMENTS

| | | | |
|---|---|---|---|
| Re. 32,088 | 2/1986 | Sip | 362/80 |
| 2,911,522 | 11/1959 | Mears | 362/273 |
| 3,195,370 | 7/1965 | Smith | 362/421 |
| 3,710,097 | 1/1973 | Bright et al. | 362/419 |
| 3,752,976 | 8/1973 | Di Salvo et al. | 362/418 |
| 3,823,314 | 7/1974 | Germany | 362/419 |
| 3,878,389 | 4/1975 | Puyplat | 362/233 |
| 3,932,837 | 1/1976 | Baker | 362/419 |
| 4,188,655 | 2/1980 | Tallon | 362/421 |
| 4,196,459 | 4/1980 | Dick | 362/80 |
| 4,306,276 | 12/1981 | Dick | 362/421 |
| 4,333,131 | 6/1982 | Hujimoto et al. | 362/419 |
| 4,412,275 | 10/1983 | McMahan | 362/289 |
| 4,471,411 | 9/1984 | Graham et al. | 362/427 |
| 4,471,413 | 9/1984 | Dick | 362/421 |
| 4,532,578 | 7/1985 | Gaden et al. | 362/80 |
| 4,639,840 | 1/1987 | McMahan et al. | 362/419 |
| 4,675,793 | 6/1987 | Capellar et al. | 362/289 |
| 4,679,125 | 7/1987 | Dick | 362/80 |

FOREIGN PATENT DOCUMENTS 890316  2/1962  United Kingdom ............... 362/419
1427387 3/1976  United Kingdom .

Primary Examiner—George L. Walton
Attorney, Agent, or Firm—Edward J. Biskup

[57] ABSTRACT

A headlamp assembly including a headlamp body located within a support frame and adapted to be mounted on the front end of a motor vehicle for selective adjustment about a substantially horizontal aim axis and a substantially vertical aim axis for obtaining the desired aim of the light beam emitted from the lamp body.

3 Claims, 7 Drawing Figures

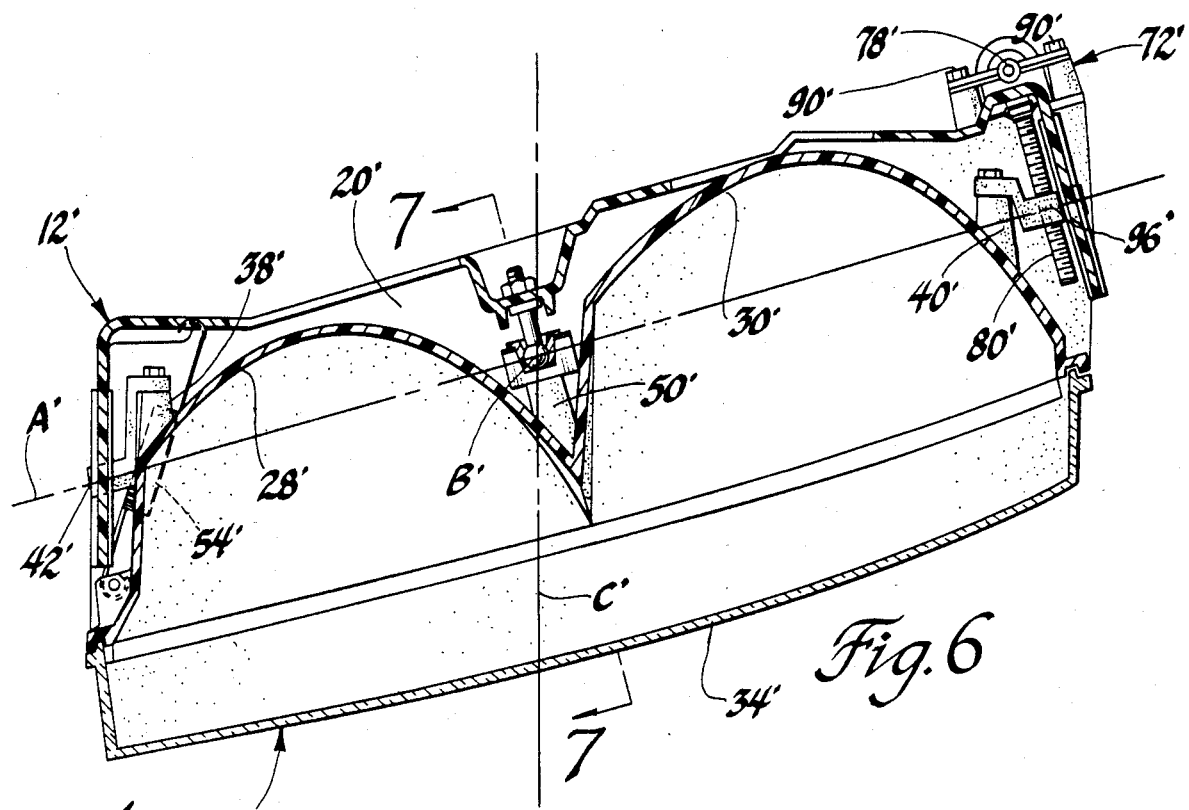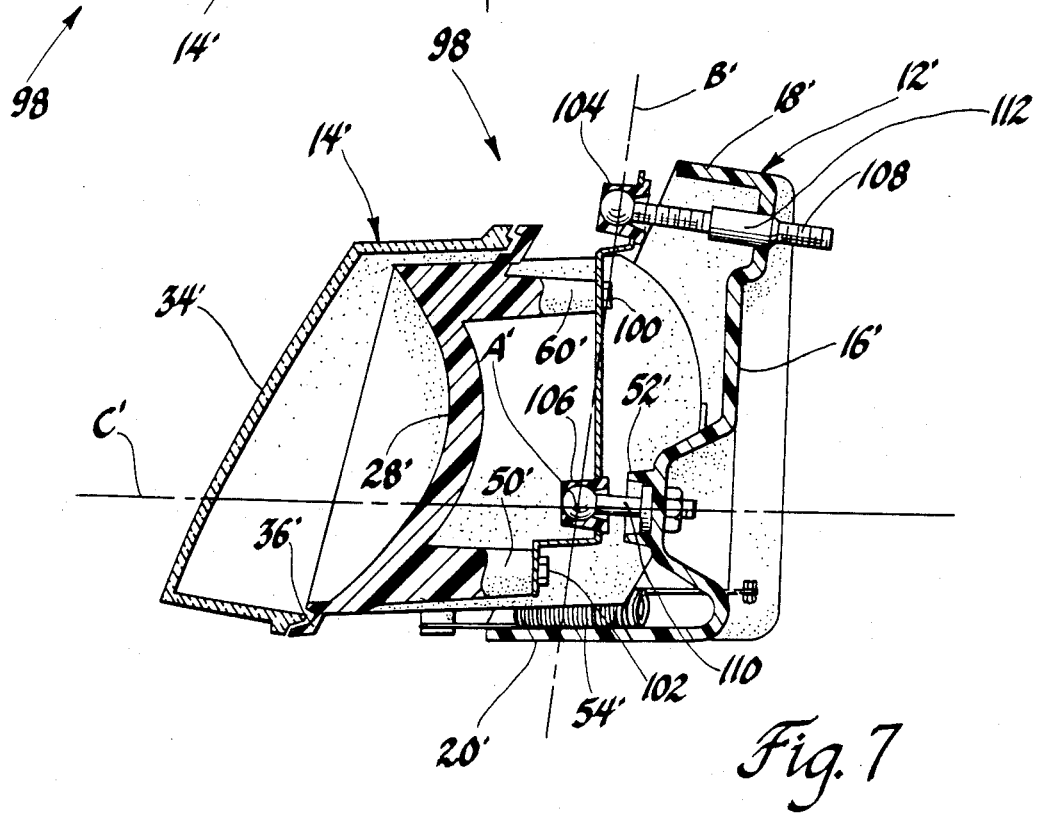

VEHICLE HEADLAMP ASSEMBLY

This invention concerns vehicle headlamps and more particularly relates to aim adjustable headlamps normally incorporated in the front end of a vehicle.

More specifically, the new and improved headlamp assembly according to the present invention is mountable on a vehicle and is selectively adjustable by screw means in a vertical plane and in a horizontal plane. The headlamp assembly includes a support frame adapted to be fixedly secured to the front end of the vehicle and has a back wall and a pair of laterally spaced side walls each of which is formed with a slot. A rectangular reflector member is located within the support frame and has its frontal portion formed with a pair of curved parabolic cavities located side by side for projecting a pair of light beams forwardly of the vehicle along the longitudinal axis thereof. The rear portion of the reflector member has a pair of oppositely extending trunion members connected thereto and located above the lower margin of the reflector member. The trunion members are received by the slots formed in the side walls of the support frame along a horizontal axis located in the horizontal plane but inclined to the longitudinal axis of the vehicle. In addition, cooperating means are provided which are carried by the back wall of the support frame and by the rear of the reflector member between the pair of parabolic cavities for universally pivotally connecting the reflector member to the support frame. Finally, first and second adjustment screws are rotatably mounted on the support frame and respectively connected to one of the trunion members and to an upper portion of the reflector member for selectively adjustably moving the reflector member in the vertical plane and in the horizontal plane.

Other features and advantages of the present invention will be apparent from the following specification when taken with the drawings in which FIG. 1 is a frontal elevational view of a headlamp assembly made according to the present invention;

FIG. 6 is a plan sectional view showing a headlamp assembly similar to that shown in FIGS. 1 through 5 but incorporating a modified form of mounting arrangement along the substantially vertical aim axis of the headlamp assembly; and FIG. 7 is a sectional view taken on line 7—7 of FIG. 6.

Figure 1:
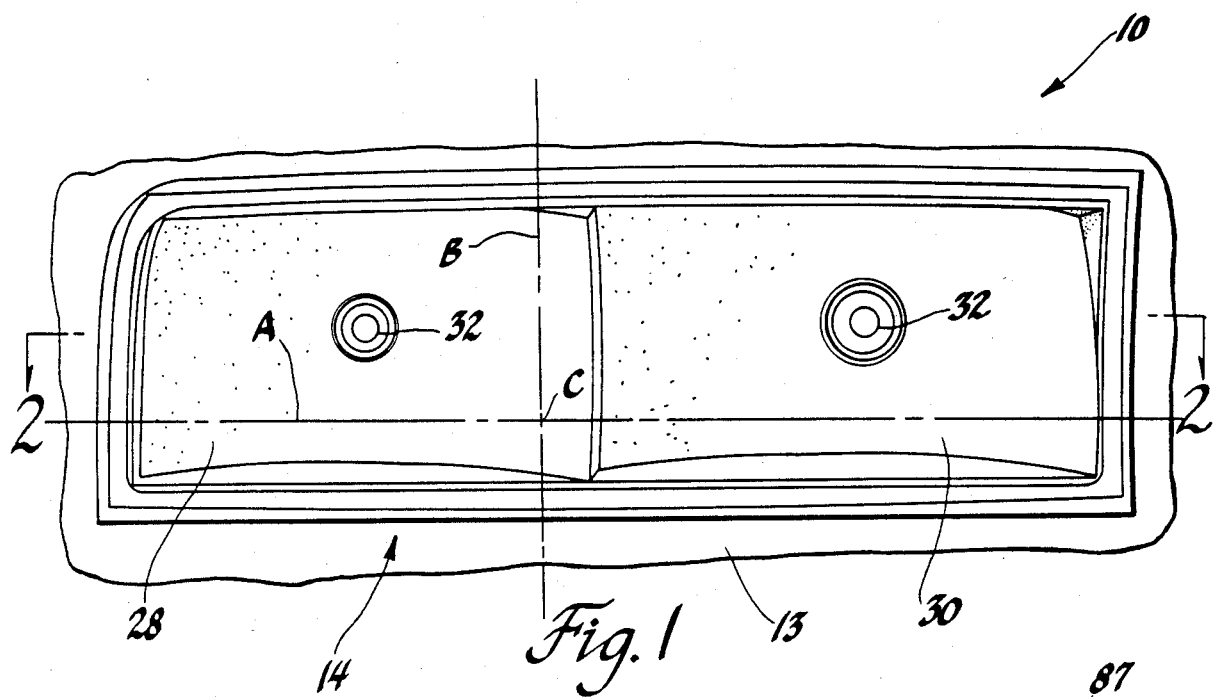
Figure 2:
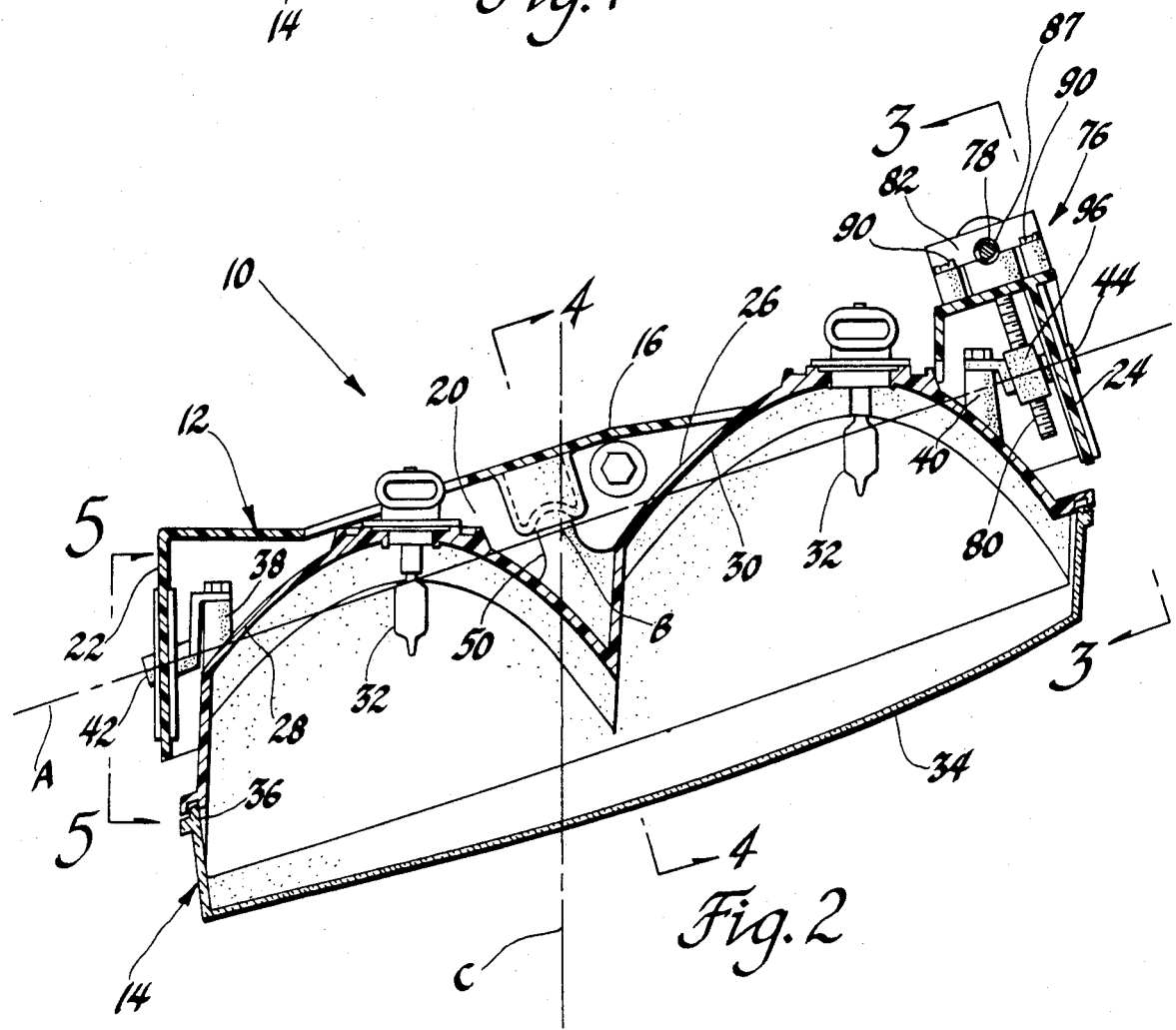
FIG. 2 is a sectional view taken on line 2—2 of FIG. 1.

Referring now to the drawings and more particularly FIGS. 1 and 2 thereof, a headlamp assembly 10 is shown of the replaceable light bulb composite type made according to the present invention. The headlamp assembly 10 includes a support frame 12 within which is mounted a lamp body 14 for selective adjustable movement in a horizontal plane containing a horizontal axis A and in a vertical plane containing a substantially vertical axis B seen in FIGS. 1 and 4. The support frame 12 is adapted to be secured to the sheet metal 13 of a motor vehicle at the front end thereof and, in its preferred form, consists of a back wall 16, upper and lower forwardly projecting walls 18 and 20, respectively, and a pair of laterally spaced side walls 22 and 24. The lamp body 14 includes a plastic reflector member 26 formed with a pair of side-by-side parabolic cavities 28 and 30 the concave surfaces of each of which is aluminized so as to project a light beam, emanating from an associated replaceable light bulb 32, forwardly and substantially parallel to an axis C. It will be noted that as shown in FIG. 2, the axis C is parallel to the longitudinal center axis of the associated vehicle (not shown) and the headlamp assembly 10 would be the right hand unit when looking at the front end of the vehicle as seen in FIG. 1. As should be apparent, the angled position of the headlamp unit 10 is due to the rounded streamline front end design currently popular with motor vehicles. Also, each light bulb 32 is provided with a single filament located so as to cause the associated aluminized parabolic surface to project a light beam forwardly of the vehicle. The light bulb 32 in the cavity 30 is provided with a filament located so as to allow the associated aluminized parabolic surface to project the so called "low beam" when energized while the light bulb 32 in the cavity 28 projects the so called "high beam" when the filament thereof is energized. Thus, the lamp body 14 is actually two separate headlamps, a low beam unit and a high beam lamp unit joined together so as to facilitate the aiming adjustment of both lamps.

Figure 3:
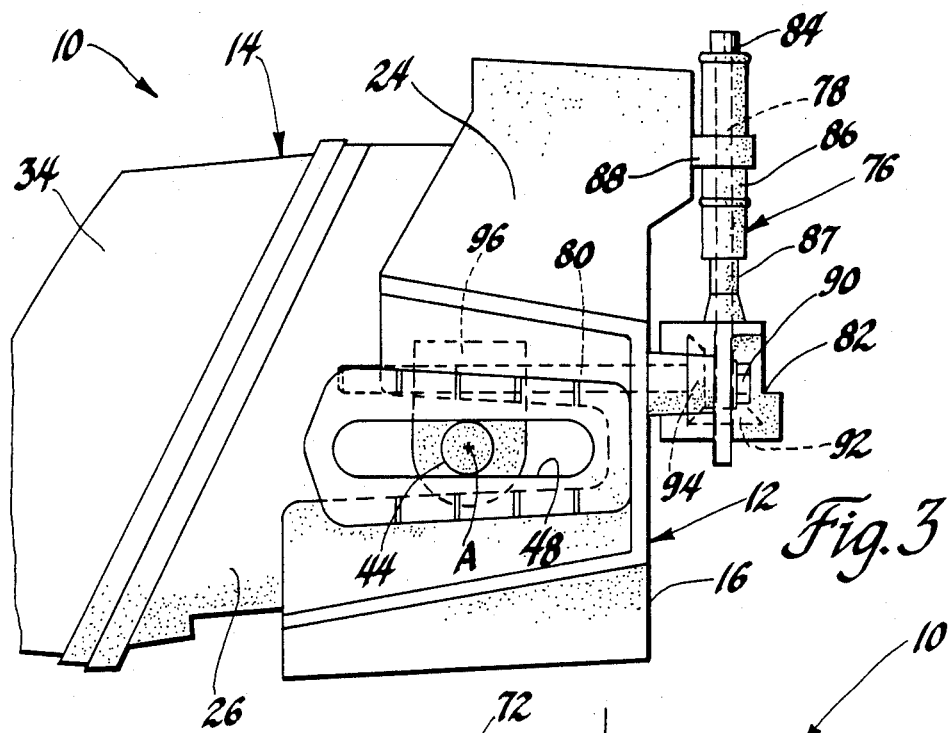
FIG. 3 is an enlarged view taken on line 3—3 of FIG. 2 showing one side of the headlamp assembly incorporating one of the two adjustment screws for adjusting the position of the headlamp.
Figure 4:
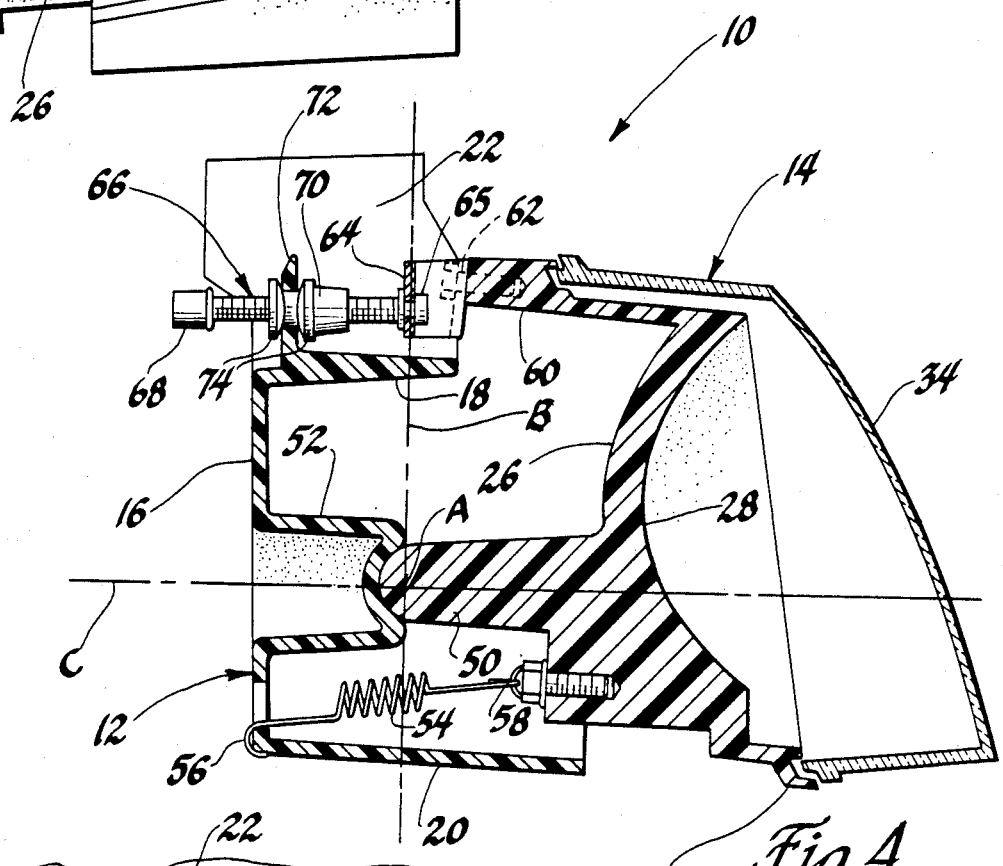
FIG. 4 is an enlarged sectional view taken on line 4—4 of FIG. 2 showing the other of the two adjustment screws used to aim the lamp body.
Figure 5:
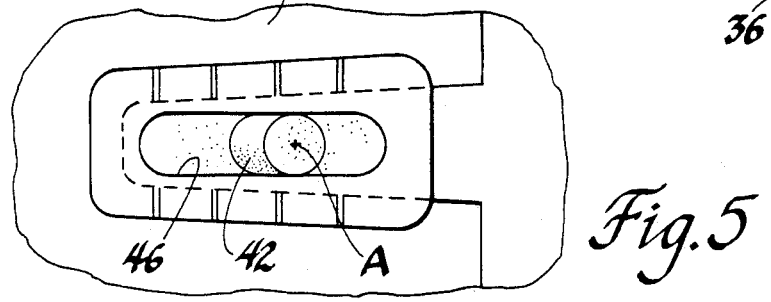
FIG. 5 is an enlarged view taken on line 5—5 of FIG. 2 showing a portion of the other side of the headlamp assembly.

The front of the reflector member 26 is closed by a glass or the like material lens 34 the rear marginal portion of which is sealingly received by a channel 36 provided around the entire margin of the front portion of the reflector member 26. The rear of the reflector member 26 has integrally formed therewith a pair of rearwardly projecting bosses 38 and 40 located adjacent the outer side portion of the cavities 28 and 30, respectively, of the reflector member 26. The bosses 38 and 40 respectively support a pair of outwardly extending trunion members 42 and 44 which, as seen in FIGS. 3 and 5, are received and supported within slots 46 and 48, respectively, formed in the side walls 22 and 24 of the support frame 12. In addition, as best seen in FIGS. 2 and 4, a third boss or projection 50 is integrally formed with the rearward portion of the reflector member 26 between the two cavities 28 and 30 thereof. As seen in FIG. 4, the projection 50 extends horizontally rearwardly from the reflector member 26 and terminates with a convex spherical outer surface which is located in a concave spherical depression formed in a generally cylindrical protuberance 52 formed in the back wall 16 of the support frame 12. The spherical outer surface of the projection 50 and the spherical depression in the protuberance 52 are held in firm contact with each other by a tension spring 54, one end 56 of which is fixed to the support frame 12 and the other end 58 of which is fixed to a lower portion of the reflector member 26. Thus, the aforesaid spherical outer surface and the spherical depression cooperate to provide a universal pivot assembly the center of which is located at the intersection of the axes A, B and C as seen in FIG. 2. Also, as will become apparent, the spring 54 maintains the cooperating surfaces together and at the same time removes all slack at the points of connection between all adjustment means and the reflector member 26.

As seen in FIG. 4, located above the projection 50 and integral with the upper margin of the reflector member 26 is a rearwardly extending tongue 60 fastened to which by a screw 62 is a flexible bracket 64 adapted to rotatably receive one end 65 of an adjustment screw 66. The other end of the adjustment screw 66 is formed with a head 68 suitably tooled for reception of a hand-adjusting device such as a screw driver for rotating the adjustment screw 66. The entire length of the shank of the adjustment screw 66 is provided with threads and a portion thereof is threadably received within a bore formed in a retainer member 70 which is non-rotatably mounted between a pair of upstanding ears (one of which only is shown in FIG. 4 and identified by reference numeral 72) integrally formed with the top wall 18 of the support frame 12. The retainer member 70 has a pair of spaced collars 74 each having a curved annular surface facing each other which allows the retainer member 70 to experience limited pivotal movement in a vertical plane passing through a vertical aim axis B seen in FIG. 4 and the axis C seen in FIG. 2. Thus, by rotating the adjustment screw 66 in one direction or the other, the lamp body 14 is adjustably movable about the horizontal aim axis A to cause the two beams of light emanating from the light bulbs 32 to be lowered or raised as desired.

On the other hand, adjustment of the lamp body 14 about the vertical aim axis B is affected by an angularly arranged adjustment mechanism 76 seen in FIGS. 2 and 3. The mechanism 76 includes a pair of orthogonally arranged shafts 78 and 80 which are interconnected in a gear housing 82. The upper end of the vertical shaft 78 is driving connected with a head 84 located above the upper wall 18 of the support frame 12 at a location easily accessible by a hand screwdriver or the like. The head 84 is integrally formed with a tubular member 86 supported for rotation by a clip means 88 attached to the back wall 16 of the support frame 12 and journaled on an upstanding portion 87 fixed to housing 82 for rotatably supporting shaft 78. The lower end of the shaft 78 extends into the gear housing 82 which is likewise suitably attached to the back wall by screws 90. As best seen in FIG. 3, the lower end of the shaft 78 has mounted thereto one bevel gear 92 of a pair of beveled gears which are meshed and suitably journaled in circular recesses of the gear housing 82. The other bevel gear 94 of the pair of beveled gears is mounted at the internal end of the other shaft 80 and the gears 92 and 94 are held in meshing engagement by means of a spring clip (not shown) inserted between a wall of the gear housing 82 and a shoulder of the shaft 80. As illustrated, the shaft 80 has its entire length threaded and as seen in FIG. 2 such threaded length of the shaft is threadably engaged in a threaded bore formed in an enlarged part 96 of the trunion member 44.

Thus, a selective rotation by a screwdriver or the like applied to the head 84 of the shaft 78 will cause rotation of the lower threaded shaft 80 within gear housing 82 resulting in a sliding adjustment of the engaged trunion member 44 and the opposite trunion member 42 for and aft in their accommodating slots 46 and 48 so that the headlamp body 14 is adjusted or aimed relative to the support frame 12 about the axis B as shown in FIG. 4.

FIGS. 6 and 7 show a headlamp assembly 98 that is essentially the same as the headlamp assembly 10 shown in FIGS. 1 through 5 except for the support mounting arrangement provided between the cavities formed in the reflector member. Accordingly, the parts of the headlamp assembly 98 that are essentially identical to and correspond to the same parts in the headlamp assembly 10 are identified by the same reference numerals but primed.

As best seen in FIG. 7, the rear portion of the reflector member 26' between the cavities 28' and 30' is integrally formed with an upper projection 60' and a lower projection 50' to which is fastened a metal bracket 98 by means of screws 100 and 102. A pair of identical plastic socket members 104 and 106 are rigidly retained by the bracket 98 and serve to respectively accommodate ball stud members 108 and 110 carried by the back wall 16' of the support frame 12'. In this regard, the ball stud member 110 has its shank portion secured to the back wall 16' and its ball portion is retained within the socket member 106 with its center located at the intersection of the axes A', B' and C'. The ball portion of ball stud member 108 has its center located within a vertical plane passing through the axis C' and has its shank portion formed with threads along its entire length. A retainer 112 is nonrotatably supported by the back wall 16' and threadably receives the shank portion of the ball stud member 108. The free end of the ball stud member 108 is formed with a slot or the like which allows a screwdriver to rotate the shank portion of the ball stud member 108 for adjusting the position of the lamp body about he horizontal axis A'. As in the case of the headlamp assembly 10, rotation of the shaft 78' causes rotation of shaft 80' with resultant fore or aft movement of the trunion 96' for positioning the lamp body 14' about the axis B' as seen in FIG. 7.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A headlamp assembly adapted to be mounted on the front end of a motor vehicle and to be selectively adjusted in a horizontal plane and in a vertical plane, said headlamp assembly including a support frame adapted to be fixedly secured to said front end of said motor vehicle and having a back wall and a pair of laterally spaced side walls, a rectangular reflector member formed with a pair of curved parabolic cavities located side by side having a pair of light bulbs for projecting a pair of light beams forwardly of the motor vehicle substantially parallel to the longitudinal axis thereof, the rear portion of said reflector member having a pair of oppositely extending trunion members connected thereto and located above the lower margin of said reflector member, each of said side walls of said support frame having a slot formed therein accommodating one of said pair of trunion members along an axis located in said horizontal plane but inclined relative to said longitudinal axis of said motor vehicle, cooperating means carried by said back wall of said support frame and by the rear portion of said reflector member between said pair of parabolic cavities for universally pivotally connecting said reflector member to said support frame to permit simultaneous adjustment of said pair of light bulb beams, first and second adjustment screw means rotatably mounted on said support frame and respectively connected to one of said pair of trunion members and to an upper portion of said reflector member for selectively adjustably moving said reflector member about said cooperation means to adjust said pair of light beams together in either said vertical plane or in said horizontal plane, and a tension spring connected between said lamp body and said support frame for firmly maintaining said cooperating means together and for removing all slack at the points of connection between said first and second adjustment screw means and said reflector member.

2. A headlamp assembly adapted to be mounted on the front end of a motor vehicle and to be selectively adjusted in a horizontal plane and a vertical plane, said headlamp assembly including a support frame adapted to be fixedly secured to said front end of said motor vehicle and having a back wall and a pair of laterally spaced side walls, a rectangular reflector member formed with a pair of curved parabolic cavities located side by side having a pair of light bulbs for projecting a pair of light beams forwardly of the motor vehicle substantially parallel to the longitudinal axis thereof, the rear portion of said reflector member having a pair of oppositely extending trunion members connected thereto and located above the lower margin of said reflector member, each of said side walls of said support frame having a horizontally extending slot formed therein accommodating one of said pair of trunion members along an aim axis located in said horizontal plane but inclined relative to said longitudinal axis of said motor vehicle, cooperating means located along said aim axis and carried by said back wall of said support frame and by the rear portion of said reflector member between said pair of parabolic cavities for universally pivotally connecting said reflector member to said support frame to permit simultaneous adjustment of said pair of light bulb beams, first and second adjustment screw means rotatably mounted on said support frame and respectively connected to one of said pair of trunion members and to an upper portion of said reflector member above said cooperating means for selectively adjustably moving said reflector member about said cooperation means to adjust said pair of light beams together in either said vertical plane or said horizontal plane, and a tension spring connected between said lamp body and said support frame for firmly maintaining said cooperating means together and for removing all slack at the points of connection between said first and second adjustment screw means and said reflector member.

3. A headlamp assembly adapted to be mounted on the front end of a motor vehicle and to be selectively adjusted in a horizontal plane and a substantially vertical plane, said headlamp assembly including a support frame adapted to be fixedly secured to said front end of said motor vehicle and having a back wall and a pair of laterally spaced side walls, a rectangular reflector member formed with a pair of curved parabolic cavities located side by side having a pair of light bulbs for projecting a pair of light beams forwardly of the motor vehicle substantially parallel to the longitudinal axis thereof, the rear portion of said reflector member having a pair of oppositely extending trunion members connected thereto and located above the lower margin of said reflector member, each of said side walls of said support frame having a horizontally extending slot formed therein accommodating one of said pair of trunion members along an aim axis located in said horizontal plane but inclined relative to said longitudinal axis of said motor vehicle, cooperating means located along said aim axis and carried by said back wall of said support frame and by the rear portion of said reflector member between said pair of parabolic cavities for universally pivotally connecting said reflector member to said support frame to permit simultaneous adjustment of said pair of light bulb beams, said cooperating means comprising a projection integrally formed with said reflector member and a spherical depression formed in said back wall, first and second adjustment screw means rotatably mounted on said support frame and respectively connected to one of said pair of trunion members and to an upper portion of said reflector member above and rearwardly of said cooperating means for selectively adjustably moving said reflector member about said cooperation means to adjust said pair of light beams together in either said vertical plane or said horizontal plane, and a tension spring connected between said lamp body and said support frame below said cooperating means for firmly maintaining said cooperating means together and for removing all slack at the points of connection between said first and second adjustment screw means and said reflector member.

* * * * *